United States Patent
Christopulos et al.

(10) Patent No.: US 9,082,015 B2
(45) Date of Patent: Jul. 14, 2015

(54) AUTOMATIC BUILDING ASSESSMENT

(71) Applicant: STATE FARM MUTUAL AUTOMOBILE INSURANCE COMPANY, Bloomington, IL (US)

(72) Inventors: Nicholas U. Christopulos, Bloomington, IL (US); Jonathan D. Maurer, Bloomington, IL (US); Nathan L. Tofte, Downs, IL (US); Roger D. Schmidgall, Normal, IL (US); James M. Freeman, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 13/839,634

(22) Filed: Mar. 15, 2013

(65) Prior Publication Data

US 2014/0270492 A1    Sep. 18, 2014

(51) Int. Cl.
*G06K 9/62* (2006.01)
*G06K 9/00* (2006.01)
*G06Q 40/08* (2012.01)

(52) U.S. Cl.
CPC ........ *G06K 9/00637* (2013.01); *G06K 9/00536* (2013.01); *G06K 9/628* (2013.01); *G06K 9/6267* (2013.01); *G06K 9/6268* (2013.01); *G06K 9/6279* (2013.01); *G06Q 40/08* (2013.01)

(58) Field of Classification Search
CPC .......... G06K 9/00536; G06K 9/00823; G06K 9/6267; G06K 9/6268; G06K 9/6279; G06K 9/628; G06Q 40/08
USPC .................................. 382/159–161, 181–231
See application file for complete search history.

(56) References Cited

U.S. PATENT DOCUMENTS

| | | |
|---|---|---|
| 5,950,169 A | 9/1999 | Borghesi et al. |
| 6,181,837 B1 | 1/2001 | Cahill et al. |
| 6,574,377 B1 | 6/2003 | Cahill et al. |
| 7,130,066 B1 | 10/2006 | Kanematu |
| 7,752,286 B2 | 7/2010 | Anderson et al. |
| 7,809,587 B2 | 10/2010 | Dorai et al. |
| 7,889,931 B2 | 2/2011 | Webb et al. |
| 7,953,615 B2 | 5/2011 | Aquila et al. |
| 7,984,500 B1 | 7/2011 | Khanna et al. |
| 8,265,963 B1 | 9/2012 | Hanson et al. |

(Continued)

OTHER PUBLICATIONS

Woodbeck et al., "Visual cortex on the GPU: Biologically inspired classifier and feature descriptor for rapid recognition", Jun. 28, 2008, IEEE Computer Society Conf. on Computer Vision and Pattern Recognition Workshops 2008, p. 1-8.*

(Continued)

*Primary Examiner* — Stephen R Koziol
*Assistant Examiner* — Timothy Choi
(74) *Attorney, Agent, or Firm* — Marshall, Gerstein & Borun LLP; Randall G. Rueth (57) ABSTRACT

Disclosed systems and methods automatically assess buildings and structures. A device may receive one or more images of a structure, such as a building or portion of the building, and then label and extract relevant data. The device may then train a system to automatically assess other data describing similar buildings or structures based on the labeled and extracted data. After training, the device may then automatically assess new data, and the assessment results may be sent directly to a client or to an agent for review and/or processing.

18 Claims, 2 Drawing Sheets

(56) References Cited

U.S. PATENT DOCUMENTS

| | | |
|---|---|---|
| 8,284,194 B2 | 10/2012 | Zhang et al. |
| 8,370,373 B2 | 2/2013 | Yamamoto |
| 8,374,957 B1 | 2/2013 | Garcia et al. |
| 8,510,196 B1 | 8/2013 | Brandmaier et al. |
| 8,527,305 B1 | 9/2013 | Hanson et al. |
| 8,537,338 B1 | 9/2013 | Medasani et al. |
| 8,543,486 B2 | 9/2013 | Donoho et al. |
| 8,651,206 B2 | 2/2014 | Slawinski et al. |
| 8,756,085 B1 | 6/2014 | Plummer et al. |
| 8,818,572 B1 | 8/2014 | Tofte et al. |
| 8,872,818 B2 | 10/2014 | Freeman et al. |
| 8,874,454 B2 | 10/2014 | Plummer et al. |
| 2002/0030142 A1 | 3/2002 | James |
| 2002/0060267 A1 | 5/2002 | Yavnai |
| 2003/0067461 A1 | 4/2003 | Fletcher et al. |
| 2003/0154111 A1 | 8/2003 | Dutra et al. |
| 2003/0212478 A1 | 11/2003 | Rios |
| 2005/0007633 A1 | 1/2005 | Kadowaki |
| 2005/0108065 A1 | 5/2005 | Dorfstatter |
| 2005/0144189 A1 | 6/2005 | Edwards et al. |
| 2005/0165517 A1 | 7/2005 | Reich |
| 2005/0276401 A1 | 12/2005 | Madill et al. |
| 2007/0050360 A1 | 3/2007 | Hull et al. |
| 2007/0179868 A1 | 8/2007 | Bozym |
| 2009/0028003 A1 | 1/2009 | Behm et al. |
| 2009/0119132 A1 | 5/2009 | Bolano et al. |
| 2009/0138290 A1 | 5/2009 | Holden |
| 2009/0148068 A1* | 6/2009 | Woodbeck .............. 382/305 |
| 2009/0265193 A1* | 10/2009 | Collins et al. .............. 705/4 |
| 2010/0094664 A1 | 4/2010 | Bush et al. |
| 2010/0104191 A1* | 4/2010 | McGwire .............. 382/190 |
| 2010/0161155 A1 | 6/2010 | Simeray |
| 2010/0228406 A1 | 9/2010 | Hamke et al. |
| 2010/0292871 A1 | 11/2010 | Schultz et al. |
| 2010/0302359 A1 | 12/2010 | Adams et al. |
| 2011/0049290 A1 | 3/2011 | Seydoux et al. |
| 2011/0187713 A1 | 8/2011 | Pershing et al. |
| 2011/0302091 A1 | 12/2011 | Hornedo |
| 2012/0004793 A1 | 1/2012 | Block |
| 2012/0013617 A1 | 1/2012 | Zhang et al. |
| 2012/0076437 A1 | 3/2012 | King |
| 2012/0179431 A1 | 7/2012 | Labrie et al. |
| 2012/0303179 A1 | 11/2012 | Schempf |
| 2013/0051639 A1 | 2/2013 | Woodford et al. |
| 2013/0233964 A1 | 9/2013 | Woodworth et al. |
| 2013/0262153 A1 | 10/2013 | Collins et al. |
| 2013/0321393 A1 | 12/2013 | Winder |
| 2014/0100889 A1 | 4/2014 | Tofte |
| 2014/0163775 A1 | 6/2014 | Metzler |
| 2014/0168420 A1 | 6/2014 | Naderhirn et al. |
| 2014/0226182 A1 | 8/2014 | Lee et al. |
| 2014/0259549 A1 | 9/2014 | Freeman et al. |
| 2014/0278587 A1 | 9/2014 | Plummer et al. |
| 2014/0297065 A1 | 10/2014 | Tofte et al. |
| 2014/0324405 A1 | 10/2014 | Plummer et al. |
| 2014/0324483 A1 | 10/2014 | Plummer et al. |

OTHER PUBLICATIONS

Kluckner et al., "Image Based Building Classification and 3D Modeling with Super-Pixels", Sep. 3, 2010, ISPRS Technical Commission III Symposium, PCV 2010, vol. XXXVIII, part 3A, p. 233-238.*
U.S. Appl. No. 13/647,098, filed Oct. 8, 2012.
U.S. Appl. No. 13/804,984, filed Mar. 14, 2013.
U.S. Appl. No. 13/836,695, filed Mar. 15, 2013.
U.S. Appl. No. 13/893,904, filed May 14, 2013.
Office Action in U.S. Appl. No. 13/647,098, dated Apr. 26, 2013.
Office Action in U.S. Appl. No. 13/647,098, dated Nov. 1, 2013.
Final Office Action for U.S. Appl. No. 13/836,695, dated Feb. 25, 2014.
Final Office Action, U.S. Appl. No. 13/647,098, dated Oct. 9, 2014.
Final Office Action, U.S. Appl. No. 14/269,920, dated Feb. 11, 2015.
Foo et al., Three-dimensional path planning of unmanned aerial vehicles using particle swarm optimization, Sep. 2006, AIAA.
Merz et al., Beyond Visual Range Obstacle Avoidance and Infrastructure Inspection by an Autonomous Helicopter, Sep. 2011, IEEE.
Nonfinal Office Action, U.S. Appl. No. 13/647,098, dated Mar. 14, 2014.
Nonfinal Office Action, U.S. Appl. No. 14/269,920, dated Sep. 25, 2014.
Nonfinal Office Action, U.S. Appl. No. 14/318,521, dated Oct. 10, 2014.
Nonfinal Office Action, U.S. Appl. No. 14/323,626, dated Sep. 17, 2014.
Nonfinal Office Action, U.S. Appl. No. 14/496,802, dated Jan. 2, 2015.
Nonfinal Office Action, U.S. Appl. No. 14/496,840, dated Jan. 5, 2015.
Office Action in U.S. Appl. No. 13/836,695, dated Oct. 3, 2013.
UTC Spotlight: Superstorm Sandy LiDAR Damage Assessment to Change Disaster Recovery, Feb. 2013.

* cited by examiner

AUTOMATIC BUILDING ASSESSMENT

FIELD OF THE DISCLOSURE

This disclosure relates to claim assessments, and in particular, to automated building assessments.

BACKGROUND

After an accident or loss, property owners typically file claims with their insurance companies. In response to these claims, the insurance companies assign an agent to investigate the claims to determine the extent of damage and/or loss and to provide their clients with appropriate compensation.

Often, the claim investigations can be time-consuming, difficult and even dangerous for the insurance agents. For example, in order to investigate a claim for damage to a home owner's roof, an agent may have to climb onto the roof, and perform inspections while on the owner's roof. By climbing on the roof and attempting to maneuver around the roof to perform his inspection, the insurance agent opens himself to a real risk of injury, especially in difficult weather conditions where the roof may be slippery because of rain, snow, and/or ice and winds may be severe.

Even if the insurance agent performs the inspection without getting injured, performing the full investigation may still be time-consuming. In addition to the time required to drive to and from the incident site and to perform the inspection itself, significant paperwork and calculations may be involved in calculating compensation owed to the clients. For example, if an insurance agent takes photos on the roof of a client's building to assess a claim for roof damage from a hurricane, in order to calculate how much money should be paid to the client, the agent may have to come back to his office, research the client's property, research the cost of the damaged property and research repair costs. All of these steps are time consuming and both delay payment to the client and prevent the agent from assessing other client claims.

In situations where the insurance company has received a large number of claims in a short time period (e.g., when a town is affected by a hurricane, tornado, or other natural disaster), an insurance agent may not have time to perform a timely claim investigations of all the received claims. If claim investigations are not performed quickly, property owners may not receive recovery for their losses for long periods of time. Additionally, long time delays when performing claim investigations can lead to inaccurate investigation results (e.g., the delay may lead to increased opportunity for fraud and/or may make it more difficult to ascertain the extent of damage at the time of the accident or loss).

SUMMARY

A device for performing building assessment includes one or more processors and a memory unit coupled to the one or more processors. The memory unit stores executable instructions that when executed by the one or more processors cause the device to receive a first set of captured data points describing a first plurality of building structures. The instructions also cause the device to extract feature data describing physical characteristics of the first plurality of building structures and train a building structure classification module based on the extracted data. After training, the instructions cause the device to receive a second set of captured data points describing a second plurality of building structures and classify at least a portion of the second set of captured data points based on the building structure classification system. After at least a portion of the second set of data points has been captured, the instructions cause the device to output one or more results of the classification.

A tangible non-transitory computer-readable medium has instructions stored thereon that, when executed by a processor, cause the processor to receive a first set of captured data points describing a first plurality of building structures. The instructions also cause the processor to extract feature data describing physical characteristics of the first plurality of building structures and train a building structure classification module based on the extracted data. After training, the instructions cause the processor to receive a second set of captured data points describing a second plurality of building structures and classify at least a portion of the second set of captured data points based on the building structure classification system. After at least a portion of the second set of data points has been captured, the instructions cause the processor to output one or more results of the classification.

A method in a computing device having a processor includes using the processor to automatically receive a first set of captured data points describing a first plurality of building structures and to automatically extract feature data describing physical characteristics of the first plurality of building structures. The method also includes automatically training a building structure classification system based on the extracted feature data using the processor. Additionally, the method includes automatically receiving a second set of captured data points describing a second plurality of building structures, automatically classifying at least a portion of the second set of captured data points based on the building structure classification system, both using the processor, and automatically outputting one or more results of classifying the at least a portion of the second set of captured data points using the processor.

DETAILED DESCRIPTION

A system and method allow a user to automatically assess a building or other physical structure. The system and method may be self-contained (i.e., the system and method may not require any outside intervention after the building or structure is automatically assessed) or may require further outside involvement (e.g., an insurance agent may be required to review and/or verify the automated assessment). Generally, the described system and method may be used to automatically assess buildings or other properties for a variety of purposes. For example, the described system and method may be used to estimate the age, type, construction, condition, and/or damage of a given building or property. The described system and method may also be used as part of an insurance underwriting process, structural analysis, building code enforcement, estimation, appraisal and assessment, or remodeling.

Before a given property or building is assessed, data describing various building structures may be collected, labeled, and categorized. For example, if a roof structure is to be assessed, a large amount of data describing several characteristics of interest (e.g., age of the roof, construction materials, structural integrity, damage, etc.) may be collected. The collected data may, for example, take the form of 3D or 2D data points and may be labeled to describe one or more of the characteristics of interest. The labeling may be done automatically or manually. Categorizing and/or labeling data may involve extracting relevant data and/or features from the collected data. The extracted data may, for example, describe physical characteristics of the property or building to be assessed. The extraction process may divide the collected data into units that may be used for training purposes and/or analyzed.

After the data described above has been collected and relevant data has been extracted, the assessment system may then be trained using the collected, labeled and extracted data. In certain embodiments, extracting data may be part of the training process. Training the assessment system may involve determining which elements of the collected data will be useful in categorization algorithms. For example, if the age of a roof structure is to be assessed, after individual tiles have been segmented, data describing the shape of individual shingles may become features or feature vectors for the classification system. Because older roofs have shingles that are worn and thus, have different 2D and/or 3D shapes from the newer shingles, the system may be programmed such that features or feature vectors describing different 2D and/or 3D shapes of shingles may be classified by age accordingly. Similarly, damaged roof shingles may have different 3D structures than new roof shingles (e.g., damaged shingles may have dents and/or cracks on their outer surfaces, and accordingly, may have different thickness profiles than new shingles). Accordingly, the system may be programmed such that features or feature vectors describing different 3D shapes of shingles may be classified to reflect different damage conditions. After useful elements have been determined, a number of classification algorithms may be used to train the system.

After the assessment system has been trained, new data describing one or more building structures may be collected. The building structures may be similar to those collected at the beginning of the training process or may be associated with dissimilar building structures. The new data may then be analyzed and categorized either in real-time or after a time delay.

The described methods can be implemented in a building assessment module operating in a stand-alone or composite computing device, for example. More generally, the assessment resolution module may operate in any suitable system having a processor capable of analyzing images in response to an assessment request (e.g., an insurance client's claim). Optionally, the assessment resolution module may operate on the processor itself. The claim assessment module may capture or receive one or more images or other data depicting a property or a geographical area, label the received or captured data, extract relevant elements from the received or captured data, engage in training to automatically classify new data based on the extracted elements comparison, and then classify new data based on this training. The classification may be used to determine various characteristics of the building or structure being assessed (e.g., age, weather damage, structural damage, etc.) After assessing the building or structure, the building assessment module may transmit the assessment for further processing or display results that can be reviewed by an outside party.

Generally speaking, the techniques of the present disclosure can be applied to assess one or more buildings or other property to determine characteristics of the assessed building or property (e.g., roof damage after severe weather, car damage after an accident, etc.) but may be used in other contexts (e.g., surveying a geographical area, assessing car damage after an accident, sub-surface inspection of underlayment and structure, assessment of structural damage, misalignment assessment, reviewing improper building techniques, assessing sagging materials, etc.), or in conjunction with more traditional techniques for assessing buildings or properties.

Figure 1:
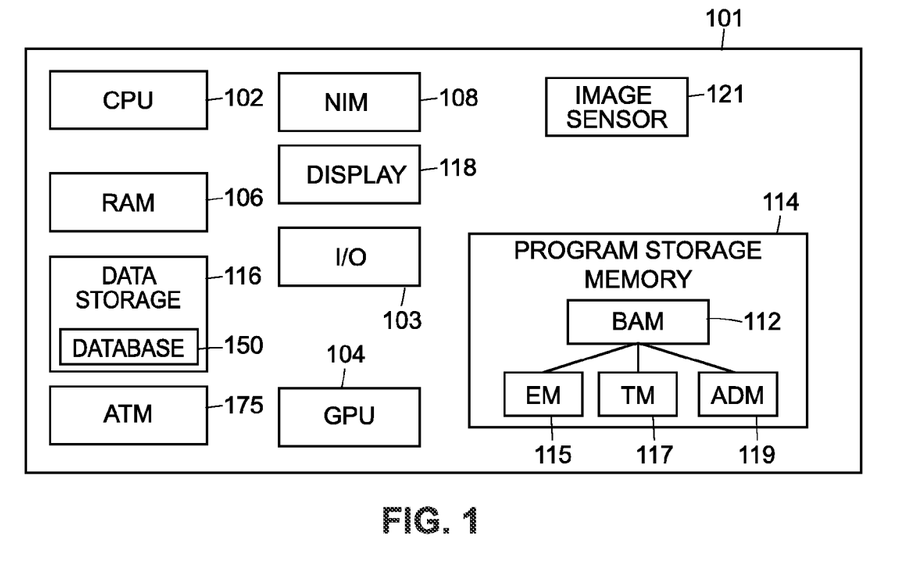
FIG. 1 depicts a block diagram of an exemplary device configured to perform building assessment according to the present disclosure.

FIG. 1 depicts a block diagram of an exemplary system 101 for performing automated building or structure assessment according to the present disclosure. The exemplary system 101 may be a portable device such as a smartphone, a personal digital assistant (PDA), a tablet personal computer (PC), a laptop computer, a handheld game console, etc., or a non-portable computing device such as a desktop computer or, in some implementations, a server. The system 101 may include one or more processors, such as a central processing unit (CPU) 102, to execute software instructions. The system 101 may also include an input/output (I/O) unit 103 and one or more image sensors 121 (e.g., cameras). The software instructions may be stored on a program storage memory 114, which may be a hard drive, an optical drive, a solid state memory device, or any other non-volatile memory device. The software instructions may retrieve data from a data storage 116, which may likewise be any non-volatile data storage device, including one or more databases 150 that are part of or external to the device 101. During execution, the software instructions may be stored in, and may store and retrieve data from, a volatile or non-volatile memory source, such as a random access memory (RAM) 106.

The device 101 may include a network interface module (NIM) 108 for wired and/or wireless communications. The network interface module 108 may allow the device to communicate with one or more other devices (not shown) using one or more of any number of communications protocols including, by way of example and not limitation, Ethernet, cellular telephony, IEEE 802.11 (i.e., "Wi-Fi"), Fibre Channel, etc. The network interface module 108 may communicatively couple the system 101 to servers and/or client devices.

The program storage memory 114 may store a building assessment module (BAM) 112 executed by the CPU 102 to perform automatic claim assessment. The building assessment module 112 may be a sub-routine of a software application or may be an independent software routine in and of itself. Alternatively, in some implementations, building assessment module 112 may be a hardware module or a firmware module. The building assessment module 112 may include compiled instructions directly executable by the CPU 102, scripted instructions that are interpreted at runtime, or both. The system 101 may also include a graphics processing unit (GPU) 104 dedicated to rendering images to be displayed on a display 118 or for offloading CPU processing to the GPU 104. The building assessment module 112 may contain one or more of extraction module (EM) 115, training module (TM) 117, and/or assessment decision module (ADM) 119.

The building assessment module 112 may assess one or more physical structures (e.g., buildings and/or portions of buildings) according to the presently described techniques. More specifically, the building assessment module 112 may automatically assess physical structures based on stored and received images, 3D point cloud or other data describing one or more physical structures, such as, for example, residential and/or commercial buildings. The images or other data may be captured, for example, by sensor 102 and stored in program storage memory 114 and/or RAM 106. The building assessment module 112 may process claim assessment data in response to data received at a device and/or stored on the receiving device or another device. In instances where the building assessment module 112 executes on a server device, the calculated assessment and/or intermediate assessment results may be sent to a client device. Additionally, the building assessment module 112 may perform certain calculations on a server device while other calculations are performed on a client device or another intermediate device. For example, the building assessment module 112 may perform image comparisons on a server device but may perform financial calculations on a client device.

Figure 2:
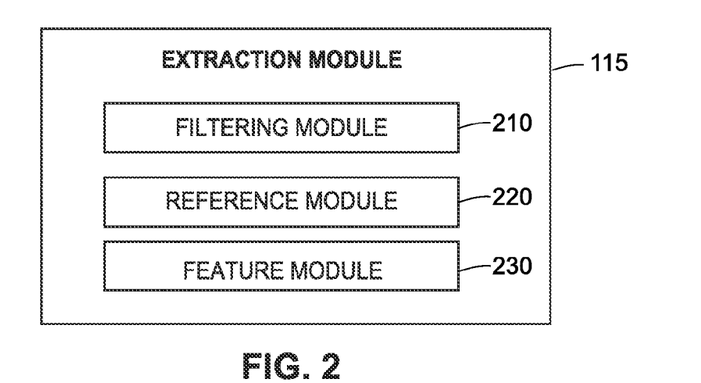
FIG. 2 depicts an extraction module according to the present disclosure.

FIG. 2 is a block diagram detailing an exemplary embodiment of the extraction module 115 according to the present disclosure. The extraction module 115 may include a filtering module 210, a reference module 220, and a feature module 230. The filtering module 210, reference module 220, and feature module 230 may be separate modules or may be combined and may interact with each other and/or with other software, hardware, and/or firmware.

Execution of building assessment module 112 may cause the processor 102 to request and/or receive, via the I/O unit 103 and/or a network connection, one or more images or other data describing buildings and/or structures similar to the buildings and/or structures to be assessed. After the image, images, 3D point cloud and/or other relevant data have been received, for example, via the I/O unit 103, building assessment module 112 may use extraction module 115 to label and/or extract relevant data from one or more of the received images and/or other data. The data may, for example, be in the form of 2-dimensional and/or 3-dimensional location coordinates. More specifically, filtering module 210 may analyze the received image data and filter out (i.e., remove from consideration for further analysis) one or more irrelevant and/or unexpected data points. For example, if a set of roofing tiles are being modeled, and building assessment module 112 receives image data depicting these tiles, the image data may also depict non-tile components that do not need to be modeled (e.g., data depicting the sun, building siding, people, and/or trees, etc.). Filtering module 210 may analyze the received image data and recognize these non-tile components and filter the non-tile components, so they are not included and/or considered when the set of data points is extracted from the received image data. Optionally, filtering module 210 may compare the received image data with predefined data describing the type of structure being modeled. The predefined data may, for example, be stored locally or remotely on a database such as database 150. If a roof structure is to be analyzed, for example, filtering module 210 may compare received images of the roofing tiles to be analyzed of with previously stored images of "stock" replacement tiles and/or 3D mathematical compositions or of a composite roofing structure.

After filtering module 210 selects relevant data from one or more of the received images, building assessment module 112 may use reference module 220 to compare the selected data with one or more predefined structure models. For example, if a set of roofing tiles are being modeled, after filtering module 210 has selected relevant data (i.e., data depicting the tiles relevant to training and/or categorization with unnecessary or irrelevant data being excluded) from the received images data depicting these tiles, building assessment module 112 may use reference module 220 to compare the selected data with data describing one or more predefined structures corresponding to the type of structure or structures being modeled and label the data accordingly. The data used in the comparison may be similar to the data used by filtering module 210 or may be different data. If a set of roofing tiles is being modeled, for example, reference module 220 may compare data extracted by filtering module 210 with previously stored images of brand-new "stock" tiles and of an intact roof. Based on these comparisons, reference module 220 may determine physical differences between the components described in the received image data (e.g., the roof tiles being analyzed) and the stock components (e.g., brand new roof tiles). For example, reference module 220 may determine that the tiles to be analyzed differ in color (e.g., due to weather aging), thickness (e.g., due to cracks or dents in the surface), and/or in height/width (e.g., due to chipping on one or more edges) from the brand-new "stock" tiles.

After these determinations are made, the data may be labeled in order to reflect which physical characteristics are reflected by the data. For example, data indicating various colors of tiles may be labeled as reflecting various states of weather ageing. Similarly, data indicating various thicknesses, heights, and/or widths of tiles may be labeled as reflecting various states of physical damages. Optionally, in certain embodiments, the data labeling may be performed manually (e.g., by a human operator reviewing the data).

Figure 3:
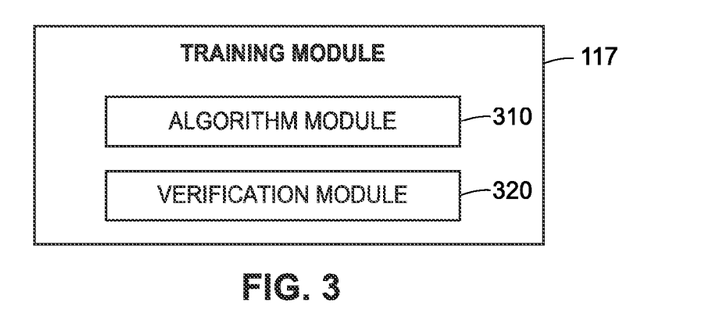
FIG. 3 depicts a training module according to the present disclosure.

Using the calculations of filtering module 210 and reference module 220, feature module 230 may analyze the calculated differences and determine valuable features in the data based on the type of assessment to be performed. For example, if a roof structure is being analyzed, feature module 230 may determine that data indicating differences in tile color are reflective of the age of and/or damage sustained by the tiles to be assessed. As another example, feature module 230 may determine that data indicating differences in tile thickness are indicative of roof damage. Similarly, feature module 230 may also determine that differences in the heights and/or widths of individual tiles are reflective of the age and/or damage sustained by the respective tiles. The categories used by feature module 230 may be generated automatically based on previously categorized data and/or may involve human intervention. For example, in certain implementations, before feature module 230 categorizes the received data, a user (e.g., an insurance agent) may input data into system 101 indicating data elements that are relevant to the particular structure being assessed. In other implementations, the relevant categories may be reused based on previously entered and/or used data elements FIG. 3 is a block diagram detailing an exemplary embodiment of the training module 117 according to the present disclosure. The training module 117 may include an algorithm module 310 and a verification module 320. Algorithm module 310 and verification module 320 may be separate modules or may be combined and may interact with each other and/or with other software, hardware, and/or firmware.

The processor 102 may use training module 117 to train the analysis system 101 to automatically assess one or more images. More specifically, training module 117 may use machine and/or statistical learning algorithms (e.g., k-nearest neighbors, decision trees, neural networks, logistic regression and support vector machines etc.) to train the assessment system based on the data extracted by extraction module 115. Initial and follow-up training may be performed by algorithm module 310, and training verification (e.g., based on known data points) may be performed by verification module 320. The training may automatically classify images of structures to be assessed based on the labels and categories determined by reference module 220 and feature module 230 as discussed above. For example, one or more images of roofing tiles may be analyzed by algorithm module 310, and based on this analysis, may be categorized and/or labeled by age and/or damage based on the color, shape, and/or thickness of the tiles depicted in the image or images. In certain embodiments, images may only be placed in a single category or receive a single label (e.g., based on age, damage condition, color, etc.), while in other embodiments, data may be placed in multiple categories or have multiple labels.

While training the assessment system 101, algorithm module 310 may use a variety of algorithms and/or computing techniques, either alone or in combination. Algorithm module 310 may initialize the training process by using a set of already-classified data as an input to algorithm module 310. In certain embodiments, this data may be the same data from which relevant classification features were previously extracted (i.e., the 2D and/or 3D data points representing various structures (e.g., roofs, chimneys, siding, doorways, windows, etc.) that might be assessed by assessment system 101. In other embodiments, other data with known characteristics may be used. This data may also represent structures that could be assessed by assessment system 101 or may represent other structures entirely.

After initializing the training process, algorithm module 310 may begin classifying and/or assessing previously unclassified data. As with the data used during the initialization of the training process, the previously unclassified data may be in the form, for example, of 2D and/or 3D data points representing structures that could be assessed by assessment system 101. As discussed above, the classification of the previously unclassified data may be performed using a number of algorithms, either alone or in combination. For example, in certain embodiments, algorithm module 310 may use a k-nearest neighbor algorithm to classify the previously unclassified data. In other embodiments, algorithm module 310 may use decision trees to classify this data. Optionally, algorithm module 310 may also use neural regression, support vector machines, or logistic regression to classify the previously unclassified data in certain embodiments. After a sufficient amount of data has been entered and classified, algorithm module 310 may optionally indicate that training of the system is complete and that the system is ready to analyze "real-world" data.

After algorithm module 310 has classified the previously unclassified data, as described above and before system 101 analyzes real-world data, verification module 320 may verify the training results before further data is processed. More specifically, verification module 320 may present data with known characteristics as an input to algorithm module 310. The presented data may be the same data from which relevant classification features were previously extracted (i.e., the 2D and/or 3D data points representing various structures (e.g., roofs, chimneys, siding, doorways, windows, etc.) that might be assessed by assessment system 101, or it may be other data with known characteristics. After this data has been processed (i.e., assessed) by algorithm module 310, verification module 320 may verify that the data has been assessed as expected.

For example, verification module 320 may present data representing a 10 year old roof tile with weather damage and large structural cracks as an input to algorithm module 310. After this data has been classified by algorithm module 310, verification module 320 may confirm that the data has been properly categorized before algorithm module 310 is allowed to process real-world data. In this example, if verification module 320 categorizes the data as representing a structure that is "aged 10 or more years," "has weather damage" and/or "has structural damage," verification module 320 may accept this as a proper categorization and may confirm that algorithm module 310 is allowed to process real-world data. If on the other hand, algorithm module 310 categorizes this same data as representing a structure that is "aged 5 or fewer years," "has little/no weather damage" and/or "has minimal structural damage," verification module 320 may determine that assessment system 101 requires further training before algorithm module 310 is allowed to process real-world data. If further training is required, algorithm module 310 may classify additional data before verification module 320 runs again to verify that the updated classification and training produces acceptable results. This process may repeat until verification module 320 confirms that algorithm module 310 produces acceptable results and therefore, is allowed to process real-world data. Following confirmation by verification module 320, algorithm module 310 saves a mathematical model based on this confirmation for use by classification module 420, which will be described in further detail with respect to FIG. 4.

Figure 4:
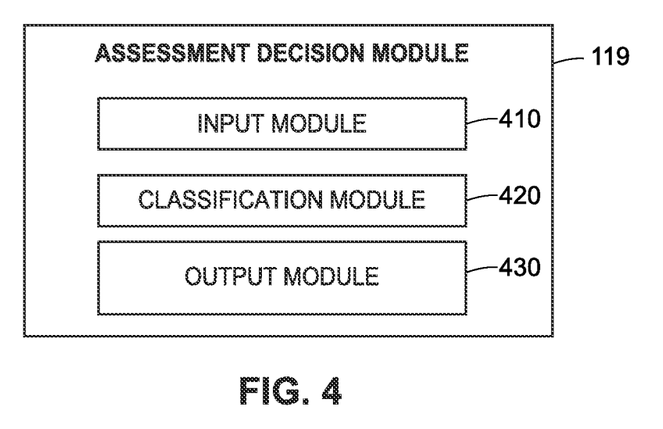
FIG. 4 depicts an assessment module according to the present disclosure.

FIG. 4 is a block diagram detailing an exemplary embodiment of the assessment decision module 119 according to the present disclosure. The assessment decision module 119 may include an input module 410, a classification module 420, and an output module 430. The input module 410, a classification module 420, and output module 430 may be separate modules or may be combined and may interact with each other and/or with other software, firmware, and/or hardware.

Again, execution of building assessment module 112 may cause the processor 102 to assess data representing one or more buildings or other physical structures, and training module 117 and extraction module 115 may be involved in the assessment process as described above. After the verification module 320 has confirmed that algorithm module 310 is operating as expected, assessment decision module 119 may review and/or analyze data representing one or more buildings or other physical structures and generate an assessment. More specifically, assessment decision module 119 may analyze data using the training performed by training module 117 and may generate a final claim assessment that may be sent to an outside user, such as an insurance agent, for further processing or directly to a client.

Input module 410 may be used to receive 2D and/or 3D data points representing various structures (e.g., roofs, chimneys, siding, doorways, windows, etc.) that are to be assessed by assessment system 101. In certain embodiments, input module 410 may need to extract 2D and/or 3D data from data received in another format. For example, input module 410 may receive image data depicting one or more structures to be analyzed. Before the structure can be analyzed, input module 410 may extract relevant data (e.g., 2D and/or 3D data points) from the received data, so that the extracted data can be analyzed by classification module 420. In certain embodiments, input module 410 may receive a mix of data, some of which is in 2D and/or 3D coordinate data form and some of which needs further processing. In these embodiments, input module 410 may extract relevant data from the appropriate subset of the received data while avoiding unnecessary analysis of the appropriately formatted data. After the further processing has been performed, the entire set of data may be analyzed by classification module 420.

As discussed above, classification module 420 may be used to analyze data (e.g., in the form of 2D and/or 3D data points) depicting one or more structures to be analyzed. More specifically, after relevant data has been received and/or extracted by input module 410, the client classification module 420 loads the mathematical model saved by algorithm 310 to be used for classification and may analyze the relevant data using techniques similar to those discussed above. More specifically, in certain embodiments, much like classification module 310 discussed above, classification module 420 may use a k-nearest neighbor algorithm to classify the previously unclassified data. In other embodiments, algorithm module 310 may use decision trees to classify this data. Optionally, algorithm module 310 may also use neural regression, support vector machines, or logistic regression to classify the previously unclassified data in certain embodiments. For example, if a home owner's wind-damaged roof is to be assessed, by using one or more of these algorithms and/or techniques, classification module 420 categorizes the data from the roof as depicting a roofing structure that "has weather damage" and/or "has structural damage."

Classification module 420 may optionally analyze the received data based on one or more classification rules. The rules may, for example, specify the allowed categories (e.g., based on the categories determined during data extraction as described above) and the allowed number of categories that a given set of data can fall under. For example, under the classification rules in one embodiment, a given set of data may be classified as either showing weather damage, the age of the structure, and/or structural damage. In this embodiment, the data may optionally be classified using one of the categories. In other embodiments, data may be classified using multiple categories. For example, for a given set of data depicting a wind-damaged roof, the available categories may be "age," "has weather damage" and/or "has structural damage," and the rules may specify that data should only be categorized using the two most relevant categories. In this embodiment, even if all three categories are relevant to the analyzed data, classification module 420 may determine that the age and structural damage are most relevant to classifying the analyzed data and may assess the data accordingly. Limiting the number of categories which may be used to classify data can be helpful, for example, to an insurance agent reviewing and/or analyzing the assessment results generated by classification module 420. In certain embodiments, image data may be classified in order to perform image segmentation to visually highlight damaged areas of one or more structures.

Output module 430 may be used in conjunction with input module 410, and/or classification module 420 to provide the results of classification module 420's analysis for further processing and/or review. More specifically, classification module 420 has assessed the received data, output module 430 may communicate with building assessment module 112 to transmit the assessment to one or more processors for further analysis and/or output the assessment such that it can be reviewed. The assessment may, for example, be sent directly to an insurance agent for further processing (e.g., manual claim assessment, filing related paperwork, review of the client's file, etc.) and/or review. The generated assessment may include a variety of information describing the condition of the property that was assessed and/or information about the assessment process itself (e.g., date, time, location, etc.). Output module 430 may operate in a serial fashion where the data returned after all necessary analysis is complete, or in a more real-time way in which a user is actively using the assessment system 101 and immediately receives feedback on a screen or other output terminal. The real-time operation may be in an augmented reality scenario where the structure's (e.g., roof's) characteristics would appear on screen and on-top of the visual of the structure. For example, in an embodiment, a user may visually inspect different portions of an assessed structure while characteristics of the structure (e.g., age, weather condition, damage, etc.) are displayed on a screen while the structure is being viewed.

Figure 5:
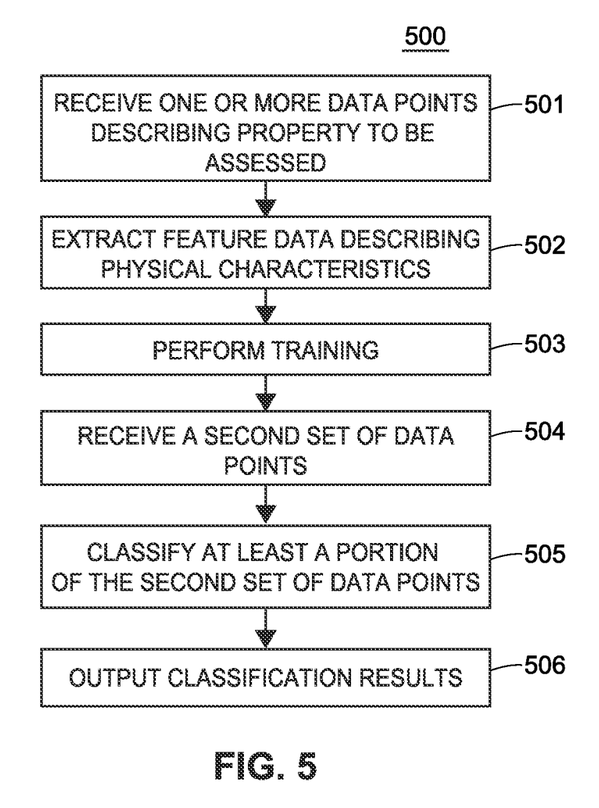
FIG. 5 depicts a flow diagram illustrating an exemplary method for automatically performing building assessment according to the present disclosure.

FIG. 5 depicts a flow diagram illustrating an exemplary method for assessing a building or structure according to the present disclosure. While the method 500 is described with respect to a single device below, the method 500 may optionally be performed on multiple devices. For example, the building assessment module 112 may be executed on a processor associated with a mobile device or on a processor associated with a server device, or may be executed partially on a processor associated with a client device and partially on a processor associated with a server device. Specifically, building assessment module 112 may execute in a processor of a client device or another computing device to collect and analyze images of a claimed property and/or structure. The building assessment module 112 may also execute in the processor of a server device, retrieving stored images and/or pricing information for transmission, in whole or in part, to a client or another computing device. Alternatively, calculations may be performed on a server/remote device while images and/or other reference data may be stored on a client or other computing device.

The method 500 begins when the building assessment module 112 receives (e.g., by capturing then retrieving, by requesting and receiving, etc.), and labels data representing property or objects to be assessed (e.g., a damaged or destroyed building structure, such as a roof) (block 501). If necessary, the data may be further processed to so that the processed data is in a format that can be analyzed by assessment module 112. For example, if image and/or video data is received, 2D and/or 3D data points may be extracted so proper assessment can be performed. The received and/or extracted data may be stored locally on a device such as assessment system 101 or remotely on a server device. As described above, the extracted and/or received data may also be labeled based on the characteristics the data reflects.

After receiving the data, the building assessment module 112 may extract, using the processor, feature data describing physical characteristics of the structure or structures to be assessed (block 502). More specifically, the building assessment module 112 may use extraction module 115 to extract relevant features and data elements that may be used in categorization from the received and/or extracted data. For example, one or more roofing structures are to be assessed, the extraction module 115 may determine which characteristics can be evaluated based on the received data. Extraction module 115 may determine these characteristics based on its own analysis or based on outside input or feedback (e.g., stored instructions or computer input indicating that certain characteristics can and/or should be evaluated).

Based on the extraction and labeling results, building assessment module 112 may perform one or more training calculations (block 503). As discussed above, initial and follow-up training may be performed in addition to training verification (e.g., based on known data points). The training may automatically classify images of structures to be assessed based on the categories determined by building assessment module 112 as discussed above. For example, if the structure being assessed is a damaged roof, the building assessment module 112 may train assessment system 101 to recognize and automatically categorize relevant characteristics for assessing a roof (e.g., age, weather damage, and/or structural damage). For other structures, building assessment module 112 may train assessment system 101 to recognize and automatically categorize other relevant characteristics for assessing the other structures, as appropriate. As discussed above, the training may be performed using one or more appropriate algorithms (e.g., k-nearest neighbors, decision trees, neural networks, logistic regression and support vector machines etc.)

The building assessment module 112 may then receive a second set of data representative of property or objects to be assessed (e.g., images of a damaged or destroyed building structure, such as a roof) (block 504). Again, if necessary, the data may be further processed so that the received data can be analyzed by building assessment module 112. Building assessment module 112 may then assess the received data and/or processed data (block 505). As discussed above, this processing may be based on one or more classification rules. The rules may, for example, specify the allowed categories (e.g., based on the categories determined during data extraction as described above) and the allowed number of categories that a given set of data can fall under. As a result of the assessment, the received data may be categorized using one or more categories. The categories may be useful in determining a number of characteristics of the property or objects that have been assessed (e.g., age, type, construction, condition, or pre-existing damage of the building structure).

The building assessment module 112 may then optionally output at least a portion of the assessment results (block 506). The results may be sent to one or more other devices for further processing and/or to a third party (e.g., an insurance agent). For example, if further review of the assessment is required before it is sent to a client, building assessment module 112 may send the generated assessment to an insurance agent for review and/or approval. The agent may, for example, manually review the captured images, review records related to the property and/or structure being assessed, or any other relevant information that might affect the assessment. In certain circumstances, the automatically generated assessment may need to be adjusted (e.g., the assessment module 112 based its age estimates on outdated reference data), and the insurance agent can adjust the assessment.

The building assessment module 112 may then optionally output at least a portion of the assessment results such that they are displayed on a screen (e.g., a computer monitor, a smartphone screen, a tablet etc.). The results may be displayed such that they are overlaid on an image or images of the structure that has been assessed. In certain embodiments, the overlaid data may change according to the displayed image or images as a user maneuvers (e.g., zooms, pans, rotates, etc.) around the image or images. In certain embodiments, the assessment may be performed in "real-time" as the user maneuvers around the image or images and the assessment results may be displayed accordingly.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA), a field programmable gate array (FPGA), etc.). A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automated building or structure assessment through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method in a computing device having a processor for automatically assessing a building structure, the method comprising:
   automatically receiving, using the processor, a first set of captured data points describing a first plurality of building structures;
   automatically extracting, using the processor, feature data describing physical characteristics of the first plurality of building structures;
   automatically training, using the processor, a building structure classification system based on the extracted feature data;
   automatically verifying, using the processor, the training of the building structure classification system using data points describing one or more additional building structures having known characteristics;
   automatically receiving, using the processor, a second set of captured data points describing a particular building structure, wherein the second set of captured data points includes a plurality of separately captured sets of data points;
   automatically classifying, using the processor, at least a portion of the second set of captured data points based on the building structure classification system and further based on one or more classification rules limiting categories of the feature data used in classifying the second set of captured data points, wherein classifying the at least a portion of the second set of captured data points includes determining a classification indicating the structural condition of a feature of the particular building structure; and
   automatically outputting, using the processor, one or more results of classifying the at least a portion of the second set of captured data points.

2. The method of claim 1 further comprising:
   displaying the one or more results of classifying the at least a portion of the second set of captured data points overlaid on one or more images of the building structure.

3. The method of claim 2, wherein displaying the one or more results of classifying the at least a portion of the second set of captured data points is performed in real time as a user scans portions of the image.

4. The method of claim 1 wherein the second set of captured data points corresponds to a portion of one or more images of the building structure being reviewed by a user.

5. The method of claim 1, wherein the classification evaluates at least one of the age, type, construction, condition, or pre-existing damage of the building structure.

6. The method of claim 1, wherein the building structure is assessed as part of at least one of: an insurance claim assessment, an insurance underwriting process, structural analysis, building code enforcement, estimation, appraisal and assessment, or remodeling.

7. A non-transitory computer-readable storage medium including non-transitory computer readable instruction to be executed on one or more processors of a system for automatically assessing a building structure, the instructions when executed causing the one or more processors to:
   receive a first set of captured data points describing a first plurality of building structures;
   extract feature data describing physical characteristics of the first plurality of building structures;
   train a building structure classification system based on the extracted feature data;
   verify the training of the building structure classification system using data points describing one or more additional building structures having known characteristics;
   receive a second set of captured data points describing a particular building structure, wherein the second set of captured data points includes a plurality of separately captured sets of data points;
   classify at least a portion of the second set of captured data points based on the building structure classification system and further based on one or more classification rules limiting categories of the feature data used in classifying the second set of captured data points, wherein classifying the at least a portion of the second set of captured data points includes determining a classification indicating the structural condition of a feature of the particular building structure; and
   output one or more results of classifying the at least a portion of the second set of captured data points.

8. The non-transitory computer-readable storage medium of claim 7, wherein the instructions when executed further cause the one or more processors to:
   display the one or more results of classifying the at least a portion of the second set of captured data points overlaid on one or more images of the building structure.

9. The non-transitory computer-readable storage medium of claim 8 wherein displaying the one or more results of classifying the at least a portion of the second set of captured data points is performed in real time as a user scans portions of the image.

10. The non-transitory computer-readable storage medium of claim 7 wherein the second set of captured data points corresponds to a portion of the one or more images of the building structure being reviewed by a user.

11. The non-transitory computer-readable storage medium of claim 7, wherein classifying at least a portion of the second set of captured data points based on the building structure classification system comprises evaluating at least one of the age, type, construction, condition, or pre-existing damage of the building structure.

12. The non-transitory computer-readable storage medium of claim 7, wherein the building structure is assessed as part of an insurance claim assessment.

13. A device operative to assess a building structure, the device comprising:
   one or more processors;
   a memory unit coupled to the one or more processors and storing executable instructions that when executed by the one or more processors cause the device to:
   receive a first set of captured data points describing a first plurality of building structures;
   extract feature data describing physical characteristics of the first plurality of building structures;
   train a building structure classification system based on the extracted feature data;
   verify the training of the building structure classification system using data points describing one or more additional building structures having known characteristics;
   receive a second set of captured data points describing a particular building structure, wherein the second set of captured data points includes a plurality of separately captured sets of data points;
   classify at least a portion of the second set of captured data points based on the building structure classification system and further based on one or more classification rules limiting categories of the feature data used in classifying the second set of captured data points, wherein classifying the at least a portion of the second set of captured data points includes determining a classification indicating the structural condition of a feature of the particular building structure; and output one or more results of classifying the at least a portion of the second set of captured data points.

14. The device of claim 13, wherein the executable instructions stored in the memory unit, when executed by the one or more processors, further cause the device to:

display the one or more results of classifying the at least a portion of the second set of captured data points overlaid on one or more images of the building structure.

15. The device of claim 13 wherein displaying the one or more results of classifying the at least a portion of the second set of captured data points is performed in real time as a user scans portions of the image.

16. The device of claim 13 wherein the second set of captured data points corresponds to a portion of the one or more images of the building structure being reviewed by a user.

17. The device of claim 13, wherein classifying at least a portion of the second set of captured data points based on the building structure classification system comprises evaluating at least one of the age, type, construction, condition, or pre-existing damage of the building structure.

18. The device of claim 13, wherein the building structure is assessed as part of an insurance claim assessment.

\* \* \* \* \*